United States Patent Office 3,070,056
Patented Dec. 25, 1962

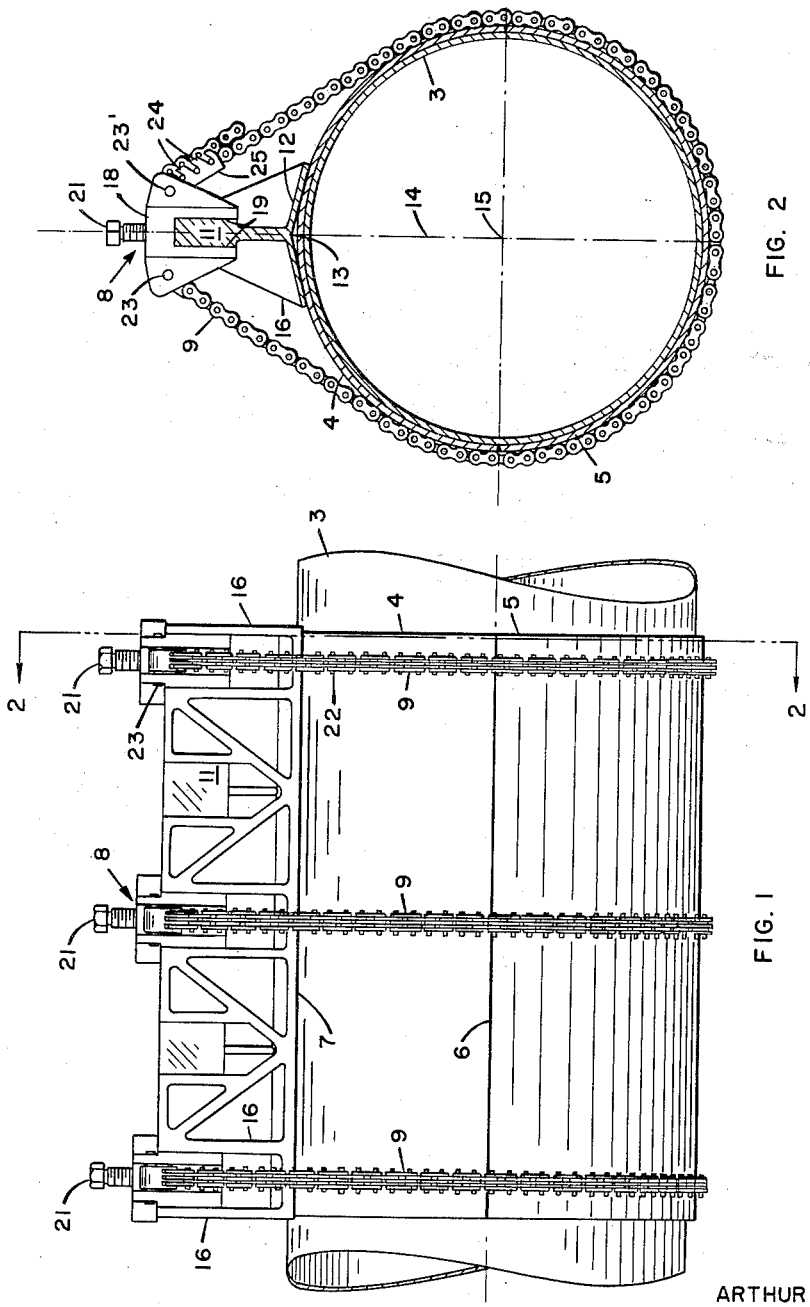

3,070,056
APPARATUS FOR REPAIRING PIPELINES
Arthur M. Hill, Tulsa, Okla., assignor to Service Pipe Line Company, Tulsa, Okla., a corporation of Maine
Filed Sept. 8, 1959, Ser. No. 838,478
2 Claims. (Cl. 113—102)

This invention relates to an apparatus for compressing a sleeve on a cylinder. More particularly, this invention relates to a banding or clamping apparatus for repairing a pipeline.

In the art of repairing holes or leaks in pipelines, various types of patches and clamps for compressing these patches and/or sleeves on pipes have been employed. With the advent of thin wall pipe and particularly with the advent of large diameter thin wall pipe, different types of patches and clamps have become necessary. It is an object of this invention to provide an improved apparatus for installing sleeves or segments of sleeves on a cylinder. It is a more specific object of this invention to provide an improved clamp for banding or compressing a sleeve on a pipeline. It is still a more specific object of this invention to provide a pipeline patch clamp which can be readily disassembled or knocked down for transportation and installation so that the parts are relatively much lighter than the complete clamp and can be handled without power equipment. Other objects of this invention will become apparent from the following description in which:

FIGURE 1 is a side view of my improved clamp in position on a pipeline; and

FIGURE 2 is a cross-sectional view taken on the line 2—2 of FIGURE 1.

In brief, my invention may be described as a knockdown type of clamp or banding apparatus for installing sleeve patches or the like on pipelines, particularly on large diameter pipelines. Referring now to the drawing for a more detailed description, the clamp is shown in position to compress a circumferentially segmented sleeve around a pipe 3. The sleeve may be a single sheet of metal wrapped around the pipe but preferably it consists of two preformed semi-cylindrical sleeves 4 and 5 having their ends butted together at oppositely disposed longitudinal joints 6 when compressed so that they may be welded together.

The knockdown clamp consists generally of three separate parts, the main body or saddle 7, the jacks 8, and the flexible bands or chains 9. This saddle comprises primarily a rectangular beam 11 which is positioned and held in place longitudinally on the pipe and sleeve by a groove, preferably a V-groove, in the bottom or in an inverted V-shaped shoe 12 attached to the bottom of the beam. The angle between the sides of this shoe is desirably in the range of about 15–45°, for example, about 30°. The apex 13 of the angle in the shoe or the beam and the groove generally are symmetrical with respect to the beam so that the center line 14 of the beam and the pipe axis 15 are held in the same plane. The shoe is generally reinforced at the outer ends by gussets 16 which extend from the top of the beam to the outer edge of the shoe and form parallel guides for the jacks 8. The guides are open ended at the top to permit removal of the jacks from the saddle.

Each of the jacks 8 comprises generally a yoke 18 having parallel arms 19 which are spaced to straddle the rectangular beam 11. The yoke is drilled and tapped symmetrically, e.g., on its axis, for insertion of a screw 21 which when threaded into the yoke raises the yoke off the beam to tighten a band 9. The band, which may as indicated be an adjustable chain such as a wrench chain with laterally extended rivets 22, is fastened at one end by a preferably removable pin 23 directly to the yoke and at the other end engages with one or more hooks 24 in shackle 25 so that its length may be adjusted. The hooks are connected directly to the laterally extended rivet ends in the wrench chain. Shackle 25 is connected to yoke 18 by pin 23' so that the shackle will align with chain 9 when the clamp is installed on various sizes of cylinders or pipes.

In operation, the top preformed semi-cyclindrical sleeve 4 or otherwise a segment of a circumferentially segmented sleeve is first placed over the top of the pipe. In some cases where there is a hole in the pipe, a rubber gasket or the like may be placed over the hole before installing the sleeve or the particular segment or segments covering the hole. The saddle 7 is then placed longitudinally of the pipe on the top segment. The jack 8, with the screw 21 retracted, is then placed astraddle the beam with the parallel arms 19 inserted in the open ended guides formed between the gussets 16 so that the jack can be moved vertically on the saddle and will be stable, i.e., will stand erect and not turn over when force is applied. The band 9 from each of the jacks is then wrapped around the pipe and connected by pin 23 and hooks 25 so that it fits the pipe loosely leaving space for the bottom semicylindrical sleeve 5 or other preformed circumferentially segmented sleeves between the bands and the pipe. When all of these segments are in place, the screws 21 are threaded into the yokes and presses against the top of the beam to raise the yokes and apply tension to the bands thus compressing the sleeve segments on the pipe. The segments can then be welded together along their longitudinally-joining ends and, if desired, they can be connected to the pipe by welding the axial ends to the pipe. Similarly, one or more preformed cylindrical segments of a sleeve may be compressed and welded peripherally to the pipe. When the bands or sleeves are thus permanently installed, the screws 21 may be unthreaded from the yokes to loosen the bands 9 so that the clamp can be removed from the pipe. It is an important element of this invention that the various parts of the clamp, namely, the saddle and the jacks or even the saddle, the jacks and the bands, can be disassembled and removed separately so that no single element is too heavy to be handled manually and safely.

From the foregoing, it can be seen that I have provided a knockdown clamp for banding or otherwise installing a sleeve or patch on a pipe, cylinder or the like. While reference has been made to a preferred embodiment in which a sleeve or partial sleeve is placed on a generally cylindrical member, and while the term "cylinder" is for convenience used in the appended claims to designate an elongated generally circular object, this invention should not be limited to the nature or shape of the object on which such a sleeve is placed.

I claim:

1. A band tensioning mechanism for compressing at least one sleeve segment on a cylinder comprising an elongated saddle, a shoe on the bottom of said saddle to position and hold said saddle symmetrically on said cylinder, gussets perpendicular to said shoe and saddle and connecting said shoe and saddle to form an elongated guide slot on each side of said saddle, said slots being open at the end opposite said shoe, a jack including a yoke with elongated parallel arms adapted to straddle said saddle and slide in said elongated guide slots, said jack also including a jack screw, said jack screw being screwed through the center of said yoke in a direction parallel to said elongated arms, an end of said jack screw abutting the edge of said saddle opposite said shoe when said jack is in position on said saddle, a band, and means to connect said band to said yoke symmetrically on opposite sides of said jack, whereby tension is applied uniformly to both ends of said band when said saddle is in position on said sleeve segment, said jack is in position on said saddle, said band extends around said cylinder and said jack screw is turned to cause said yoke to move away from said saddle.

2. A band tensioning mechanism for compressing at least one sleeve segment on a cylinder comprising an elongated saddle, a shoe on the bottom of said saddle to position and hold said saddle symmetrically on said cylinder, gussets perpendicular to said shoe and saddle and connecting said shoe and saddle to form a plurality of elongated guide slots arranged in pairs along said saddle, said slots being open at the end opposite said shoe, a plurality of jacks, each jack including a yoke with elongated parallel arms adapted to straddle said saddle and slide in a pair of elongated guide slots, each jack also including a jack screw, said jack screw being screwed through the center of said yoke in a direction parallel to said elongated arms, an end of said jack screw abutting the edge of said saddle opposite said shoe when said jack is in position on said saddle, a band for each jack, and means to connect said band to said yoke symmetrically on opposite sides of said jack, whereby tension is applied uniformly to both ends of each band when said saddle is in position on said sleeve segment, each jack is in position on said saddle, each band extends around said cylinder and each jack screw is turned to cause each yoke to move away from said saddle.

References Cited in the file of this patent
UNITED STATES PATENTS

| | | |
|---|---|---|
| 1,935,902 | Brant | Nov. 21, 1933 |
| 2,108,077 | Robinson | Feb. 15, 1938 |
| 2,167,887 | Graham et al. | Aug. 1, 1939 |
| 2,585,343 | Newlon | Feb. 12, 1952 |

FOREIGN PATENTS

| | | |
|---|---|---|
| 596,816 | Germany | Aug. 30, 1931 |